June 5, 1962  J. GASSMANN  3,037,348
GAS TURBINE ARRANGEMENT, PARTICULARLY FOR MOTOR VEHICLES
Filed Sept. 26, 1957
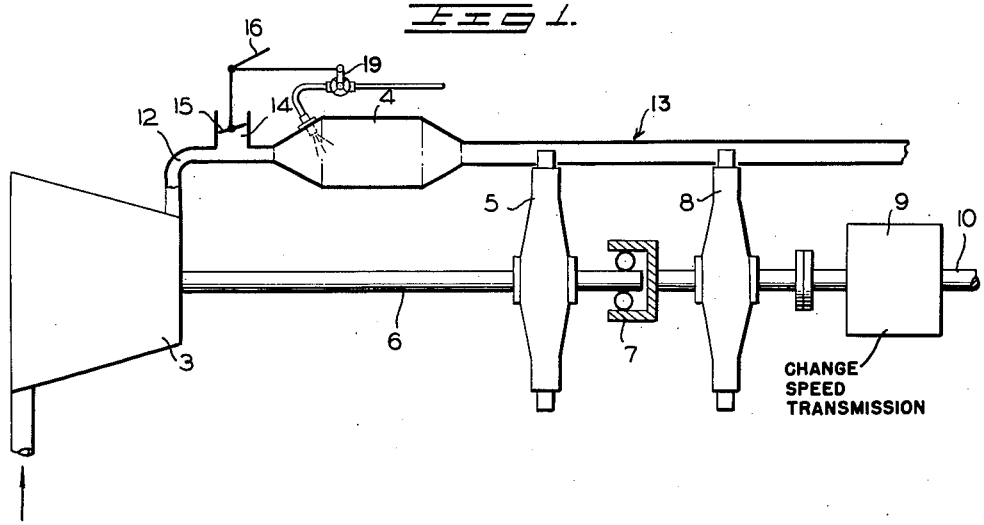
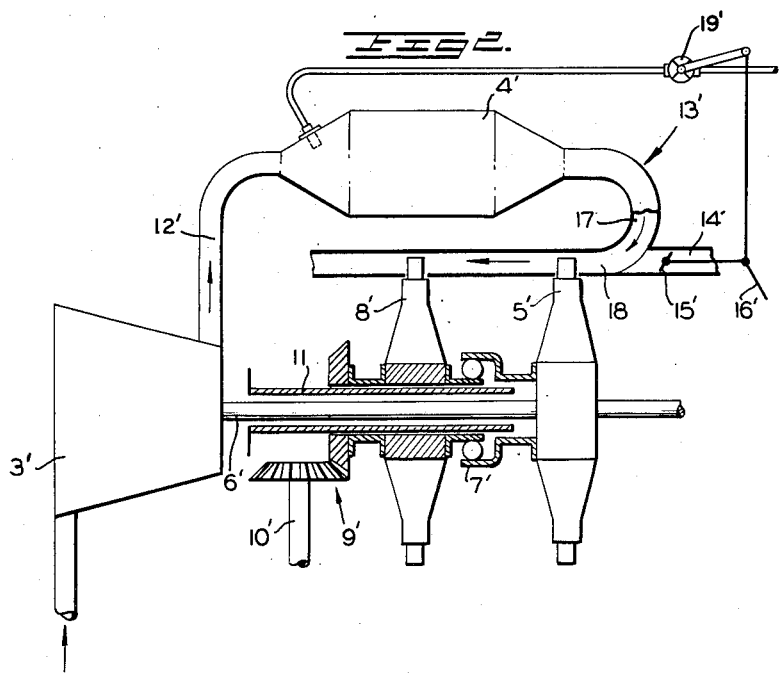
INVENTOR
JOHANNES GASSMANN
BY Dicke and Craig
ATTORNEYS

# United States Patent Office 3,037,348
Patented June 5, 1962

3,037,348
GAS TURBINE ARRANGEMENT, PARTICULARLY
FOR MOTOR VEHICLES
Johannes Gassmann, Altbach, near Esslingen (Neckar),
Germany, assignor to Daimler-Benz Aktiengesellschaft,
Stuttgart-Unterturkheim, Germany
Filed Sept. 26, 1957, Ser. No. 686,471
Claims priority, application Germany Sept. 28, 1956
13 Claims. (Cl. 60—39.16)

The present invention relates to an arrangement for braking an aggregate or unit driven by a gas turbine installation, particularly of a motor vehicle, and more particularly to a gas turbine installation which consists of a compressor, of a combustion chamber, of a compressor turbine, of a work or output turbine separate or spaced from the compressor turbine, and of a line or conduit leading into the atmosphere and to discharge energy means into the atmosphere, and wherein a closure member or valve is arranged in the discharge line or conduit which is opened during actuation of the brake member for the aggregate or unit driven by the gas turbine installation.

The present invention consists therein that the discharge line or conduit is arranged between the compressor and the compressor turbine, and that the turbine wheels of the output turbine are adapted to be connected with those of the compressor turbine by means of a freewheeling device, such as a one-way clutch.

Discharge valves with closure members controlled by the brake linkage as well as one-way freewheeling devices between the compressor turbine and the output turbine are each known per se for various purposes in the prior art, and do not form by themselves the subject of the present invention. On the contrary, the present invention resides in the recognition of the problem concerning braking of units driven by gas turbine installations and in the solution therefor by the particular combination of these two features, known per se, whereby it is advantageously achieved that the compressor work or output may be used for braking the driven aggregate or unit, especially of a motor vehicle.

In accordance with a further feature of the present invention, the line or conduit leading into atmosphere may be arranged between the compressor and the combustion chamber. However, the discharge line may also be arranged between the combustion chamber and the turbine section of the installation. In the former case, it is advantageously achieved that the combustion chamber is filled up only slightly by the air issuing from the compressor and is, therefore, rapidly again ready for operation after braking ceases, whereas in the latter case it is made possible that the combustion gases which in the first few instances during braking are still present in the combustion chamber and in the supply line leading to the turbine section may flow off into the atmosphere without loading the turbine.

According to a further feature of the present invention, the direction of the discharge line leading into atmosphere may be approximately the same as the following line section of the line or conduit coming from the compressor or from the combustion chamber.

Accordingly, it is an object of the present invention to provide a brake arrangement for an aggregate or unit driven by a gas turbine which is simple in construction and reliable as well as effective in operation.

Another object of the present invention resides in the arrangement of a gas turbine installation driving an aggregate or unit, such as a motor vehicle, which by simple means enables effective braking of the motor vehicle by the gas turbine installation.

Still another object of the present invention resides in a braking system for a unit driven by a gas turbine installation which effectively increases the braking action of the gas turbine on the driven unit by additionally utilizing the compressor work for purposes of braking.

These and further features, objects and advantages of the present invention will become more obvious from the following description when taken in connection with the accompanying drawing, which shows, for purposes of illustration only, two embodiments in accordance with the present invention and wherein:

FIGURE 1 is a schematic diagram of a gas turbine installation adapted to be used for braking the driven shaft thereof in accordance with the present invention, and FIGURE 2 is a schematic diagram of a modified embodiment of a gas turbine installation adapted to brake the driven shaft thereof in accordance with the present invention.

Referring now to the drawing, and more particularly to FIGURE 1, reference numeral 3 designates a compressor or turbo-charger of known construction, reference numeral 4 designates a combustion chamber connected with the compressor 3 by a line or conduit 12, and reference numeral 5 designates a compressor turbine which is driven by the gases in the line 13 connected with the output of combustion chamber 4. The combustion gases in line 13 also drive the work or output turbine 8. The compressor turbine 5 drives the compressor 3 by means of a shaft 6. The load turbine 8 normally operates at a lesser rotational speed than the compressor turbine 5 and is connected with a driven shaft 10 by means, for example, of a change-speed transmission 9. The compressor turbine 5 and the output turbine 8 are connected with each other by means of a one-way freewheeling device, such as a one-way clutch, which enables the turbine 5 to overrun the turbine 8 but prevents overrunning of the turbine 8 with respect to the turbine 5. The driven shaft 10 may be connected, for example, with the driven wheels of a motor vehicle in any suitable manner.

In FIGURE 1, the compressor turbine 5 adjoins or follows the compressor 3 in the usual manner, the output turbine 8 adjoins or follows the compressor turbine 5 in the usual manner while the transmission 9 follows the output turbine 8 in the usual manner. A supply or inlet line 12 connects the compressor 3 with the combustion chamber 4, as already mentioned hereinabove. A branch line 14 which discharges into the atmosphere and which contains a closure member 15, such as a valve, is connected with the supply line 12. The brake actuating member, schematically illustrated in FIGURE 1 and designated by reference numeral 16 is connected with the valve member 15 in such a manner that the valve 15 is opened upon actuating the brake actuating member 16 to render the brake system operative, for instance, by energizing the vehicle brakes of conventional construction.

In the embodiment of FIGURE 2, primed reference numerals are used to designate parts corresponding to similar parts of FIGURE 1. The embodiment of FIGURE 2 again includes a compressor 3' which is connected with a combustion chamber 4' by means of a supply or inlet line 12'. The work or output turbine 8' and transmission 9' are thereby disposed between compressor 3' and compressor turbine 5'. The compressor turbine 5' is connected with the compressor 3' by means of a shaft 6' which extends through the transmission generally designated by reference numeral 9' and through the output turbine 8'. The transmission 9' and the wheel or wheels of the output turbine 8' are thereby supported on a stationary hollow shaft 11 which surrounds the shaft 6' connecting the compressor 3' with the compressor turbine 5'.

The transmission 9' which connects the output turbine 8' with the driven shaft 10' may include, for example of a pair of bevel gears to provide an angular relationship between the axes of the turbines and of the output shaft 10'. The output turbine 8', which may rotate at a speed slower than the compressor turbine 5', is also connected with the compressor turbine 5' by means of a one-way freewheeling device 7' which prevents the turbine 8' from overrunning the compressor turbine 5'. The line leading from the combustion chamber 4' to the turbines 5' and 8', generally designated by reference numeral 13', includes a bent or reversing line section 17 while the discharge line 14' leading into the atmosphere has about the same direction as the line section 18 which adjoins or follows the reversing line section 17.

The discharge line 14' again is provided with a closure member 15' such as a valve which is connected with the brake actuating member 16' in any suitable manner.

It is understood that the valve member 15 or 15' may be of any suitable construction and may be operatively connected with the actuating member 16 or 16' of vehicle brake in any suitable manner, for example, mechanically by a suitable linkage as schematically illustrated in the drawing, or hydraulically, if a hydraulic brake system is used or electrically. The hydraulic system may thereby be so arranged that the brake fluid system or a separately energized hydraulic system which is controlled by the brake actuating member, controls the valve member 15 or 15'. An electric control may be established in the alternative by providing an electromagnetic actuating mechanism for controlling the valve member 15 or 15', which may be selectively energized, for example, by means of a switch, rheostat or the like connected with the brake actuating member 16 or 16'. It is, of course, also understood that actuating member 16 or 16' may be independent of any other brake system, and may be arranged within easy reach of the operator, for instance, at the dash-board, steering wheel, etc., of a motor vehicle.

Operation

If the driven aggregate or unit, such as the vehicle is to be braked, then it becomes necessary that (1) The fuel supply to the combustion chamber be interrupted by means of any suitable conventional control device, which may be controlled, for example, mechanically, hydraulically, electrically, etc., and may be operatively connected with the brake actuating member 16 or 16' for simultaneous actuation thereby, and (2) The line 14 or 14' leading into the atmosphere be opened by means of opening the valve member 15 or 15', respectively.

After carrying out these two aforementioned control steps for effecting braking, which may be carried out simultaneously by a suitable interconnection between brake actuating member 16 or 16' and a fuel control member or fuel cut-off device of appropriate construction such as designated by reference numerals 19 or 19', the compressor turbine 5 or 5' no longer receives gases which contain energy whereby the rotational speed of the turbine wheels thereof decreases rapidly, and thereby rapidly approaches the speed of the normally slower wheel or wheels of the output turbine 8 or 8' which is now driven by the vehicle and the rotational speed of which does not decrease as rapidly. As soon as the rotational speed of the compressor turbine 5 or 5' reaches the speed of the output turbine 8 or 8', the freewheeling device 7 or 7' will become effective whereby the wheels of the output turbine 8 or 8', of the compressor turbine 5 or 5' and of the compressor 3 and 3' are connected for synchronous operation.

Consequently, the energy produced by the vehicle is now dissipated by the compressor work done by the compressor 3 or 3'. In addition thereto, the wheels of the compressor turbine 5 or 5' and of the output turbine 8 or 8', now driven by the vehicle, become effective as impeller or pump wheels and suck or draw in a part of the air coming from the compressor 3 or 3' which has become pressureless by reason of the opening of the line 14 or 14' leading into the atmosphere so that the wheels of the compressor turbine 5 or 5' and of the working turbine 8 or 8' increase the energy which must be produced by the vehicle and thereby render the braking effect of the vehicle still more effective.

The actual construction of the arrangement illustrated in FIGURE 1 and FIGURE 2 may be of any suitable conventional construction. For example, the embodiment according to FIGURE 2 may be constructed as shown and described more fully in my co-pending application S.N. 686,534 filed September 26, 1957, and entitled "Gas Turbine Installation."

Moreover, the type of transmission 9 or 9' and the particular construction of the freewheeling device 7 or 7' may be varied at will. For example, instead of a mechanical freewheeling device, a hydraulically or electromagnetically controlled clutch may be substituted therefor in case of a hydraulic or electric control for valve 15 or 15'. The other parts may also be suitably varied to comply with the requirements of the particular installation.

While I have shown and described two embodiments in accordance with the present invention, it is understood that the same is not limited thereto but is susceptible of many changes and modifications within the scope of the present invention and I intend to cover all such changes and modifications as encompassed by the appended claims.

I claim:

1. An arrangement for braking a unit driven by a gas turbine installation, comprising compressor means, combustion chamber means, compressor turbine means driving said compressor means, output turbine means, output means driven by said output turbine means, means connecting said compressor means with said combustion chamber means and connecting said combustion chamber means with said turbine means, brake means for braking said output means including a discharge line provided with closure means connected with said connecting means intermediate said compressor means and said turbine means, actuating means for controllably opening said closure means to selectively connect said connecting means with the atmosphere during braking of the unit, to thereby reduce the pressure from said compressor means to said turbine means, and means operative incidental to the reduction of said pressure for connecting said turbine means together for common rotation.

2. The combination according to claim 1 wherein said means operative incidental to the reduction of said pressure is a freewheeling device preventing said output turbine means from over-running said compressor turbine means.

3. The combination according to claim 1 wherein said discharge line is connected with said connecting means intermediate said compressor means and said combustion chamber means.

4. The combination according to claim 1 wherein said discharge line is connected with said connecting means intermediate said combustion chamber means and said turbine means.

5. An arrangement for braking a unit driven by a gas turbine installation, particularly of a motor vehicle, said gas turbine installation comprising compressor means, combustion chamber means, compressor turbine means for said compressor means, output turbine means spaced from said compressor turbine means and driving said unit, means connecting said compressor means with said combustion chamber means and connecting said combustion chamber means with said turbine means, brake means including a discharge line provided with closure means opened during braking and connected with said connecting means intermediate said compressor means and said compressor turbine means to selectively establish a communication between said connecting means and the atmosphere whereby the pressure to said turbine means is reduced during normal braking of the unit, and means operative incidental to the reduction of said pressure for connecting said two turbine means with each other to operate synchronously.

6. The combination according to claim 5 wherein said operative incidental to the reduction of said pressure means is a freewheeling device.

7. The combination according to claim 6 wherein said discharge line is connected to said connecting means intermediate said combustion chamber means and said turbine means and has essentially the same longitudinal axis as the line section formed by said connecting means following the same.

8. The combination according to claim 1 further comprising means simultaneously operated by said brake means for interrupting the fuel supply to said combustion chamber means during braking.

9. An arrangement for braking a unit driven by a gas turbine installation, particularly of a motor vehicle, said gas turbine installation comprising compressor means, combustion chamber means with control means for controlling the supply of fuel fed thereto, compressor turbine means driving said compressor means, output turbine means spaced from said compressor turbine means, line means including one line section connecting said compressor means with said combustion chamber means and another line section connecting said combustion chamber means with said turbine means, brake means for braking said unit including a discharge means leading to the atmosphere and connected with said line section connecting means intermediate said compressor means and said compressor turbine means, valve means in said discharge means, and actuating means simultaneously opening said valve means and adjusting said control means to interrupt the supply of fuel to said combustion chamber means, and means for establishing a drive from said output turbine means to said compressor means after actuation of said actuating means comprising one-way engaging means between said two turbine means to prevent said output turbine means from overrunning said compressor turbine means.

10. The method of braking an output shaft driven by a gas turbine installation including a compressor, a combustion chamber, a compressor turbine driving said compressor, an output turbine driving said output shaft, and a line system connecting said compressor with said combustion chamber and said combustion chamber with said turbines, both of said turbines being driven by the gases supplied from said combustion chamber and being connected with each other by means of a freewheeling device, comprising the step of venting said line during braking of said output shaft to cause said turbines to act as pumps and to thereby aid in the braking of said shaft.

11. The method according to claim 10 further comprising the step of simultaneously interrupting the supply of fuel to said combustion chamber during venting of said line system.

12. The method according to claim 11, wherein said compressor acts as a load element for said output shaft during the braking of said output shaft.

13. In a unit subject to a braking effect responsive to operation of a brake actuator, an arrangement for producing a braking effect additional to said first-named braking effect comprising compressor means, combustion chamber means and output means, means comprising a compressor turbine drivingly connected with said compressor means, means comprising an output turbine drivingly connected with said output means, conduit means interconnecting said compressor means, said combustion chamber means, said compressor turbine and said output turbine, brake means for braking said output means including a discharge line connected with said interconnecting means intermediate said compressor means and said compressor turbine, controllable closure means for said discharge line, actuating means including said brake actuator for selectively opening said closure means to connect said conduit means with the atmosphere during braking of the unit to thereby reduce the pressure from said compressor means on said compressor turbine and said output turbine, and means establishing a driving connection from said output means to said compressor means after opening of said closure means by said actuating means, said means establishing said driving connection comprising disengageable means connecting said output turbine and said compressor turbine for common rotation.

References Cited in the file of this patent

UNITED STATES PATENTS

| | | |
|---|---|---|
| 2,139,090 | Lysholm et al. | Dec. 6, 1938 |
| 2,219,994 | Jung | Oct. 29, 1940 |
| 2,559,623 | Holmes | July 10, 1951 |
| 2,591,540 | Grylls | Apr. 1, 1952 |
| 2,618,926 | Pfenninger | Nov. 25, 1952 |
| 2,670,598 | Millingen | Mar. 2, 1954 |
| 2,707,865 | Huebner | May 10, 1955 |
| 2,759,327 | Huber | Aug. 21, 1956 |

FOREIGN PATENTS

| | | |
|---|---|---|
| 541,307 | Great Britain | Nov. 21, 1941 |